US012581438B2

(12) United States Patent
Takahashi et al.

(10) Patent No.: US 12,581,438 B2
(45) Date of Patent: Mar. 17, 2026

(54) BASE STATION AND USER EQUIPMENT

(71) Applicants: DENSO CORPORATION, Kariya-city (JP); TOYOTA JIDOSHA KABUSHIKI KAISHA, Toyota (JP)

(72) Inventors: Hideaki Takahashi, Kariya-city (JP); Masayuki Hoshino, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 18/314,731

(22) Filed: May 9, 2023

(65) Prior Publication Data

US 2023/0284160 A1    Sep. 7, 2023

Related U.S. Application Data

(63) Continuation of application No. PCT/JP2021/036016, filed on Sep. 29, 2021.

(30) Foreign Application Priority Data

Nov. 11, 2020    (JP) ................................. 2020-188299

(51) Int. Cl.
  *H04W 56/00*     (2009.01)
  *H04B 17/318*    (2015.01)
  *H04W 24/10*     (2009.01)
(52) U.S. Cl.
  CPC ...... *H04W 56/0015* (2013.01); *H04B 17/328* (2023.05); *H04W 24/10* (2013.01)
(58) Field of Classification Search
  CPC . H04W 56/0015; H04W 24/10; H04W 48/12; H04B 17/328; H04L 5/005; H04L 5/0092; H04L 5/0053

(Continued)

(56) References Cited

U.S. PATENT DOCUMENTS

| 2018/0192383 A1 | 7/2018 | Nam et al. |
| 2020/0045658 A1 | 2/2020 | Nam et al. |

(Continued)

FOREIGN PATENT DOCUMENTS

| JP | 2020504971 A | 2/2020 |
| JP | 2022076780 A | 5/2022 |

(Continued)

OTHER PUBLICATIONS

Vivo et al., "Framework and Principles for Reduced Capacity NR Devices", Document R1-2007671, 3GPP TSG RAN WG1 #103-e, Oct. 26-Nov. 13, 2020.

(Continued)

*Primary Examiner* — Obaidul Huq

(74) *Attorney, Agent, or Firm* — Harness, Dickey & Pierce, P.L.C.

(57)                ABSTRACT

A base station according to an aspect of the present disclosure includes a memory storing a program, and one or more processors configured to execute the program to transmit frequency information indicating an Absolute Radio Frequency Channel Number of a Synchronization Signal and Physical Broadcast Channel, SS/PBCH, block, SSB, used for a Reduced Capability user equipment, and measurement information used for the Reduced Capability user equipment to perform measurement based on the SSB. The measurement information includes information indicating measurement timing for the measurement based on the SSB.

12 Claims, 8 Drawing Sheets

(58) Field of Classification Search
    USPC ........................................ 370/464, 498, 503
    See application file for complete search history.

(56)                    References Cited

U.S. PATENT DOCUMENTS

2021/0058879  A1      2/2021  Geng et al.
2021/0092629  A1      3/2021  Fang et al.
2021/0235339  A1*     7/2021  Babaei .................. H04W 36/06
2022/0117004  A1*     4/2022  Lee ..................... H04W 72/044
2022/0124513  A1      4/2022  Nakamura et al.
2023/0036057  A1*     2/2023  Lei .......................... H04W 8/22

FOREIGN PATENT DOCUMENTS

JP            2022076781  A      5/2022
WO            2019/214621  A1    11/2019
WO       WO-2019214739  A1      11/2019
WO       WO-2020166411  A1       8/2020
WO       WO-2020167232  A1       8/2020

OTHER PUBLICATIONS

U.S. Appl. No. 18/314,690, filed May 9, 2023, Takahashi et al.
U.S. Appl. No. 18/314,715, filed May 9, 2023, Takahashi et al.
International Search Report regarding International Patent Application No. PCT/JP2021/036016, dated Dec. 21, 2021.
3GPP TS 38.331 V16.2.0 (Sep. 2020) "3rd Generation Partnership Project; Technical Specification Group Radio Access Network; NR; Radio Resource Control (RRC) protocol specification (Release 16)".
3GPP TS 38.300 V16.3.0 (Sep. 2020) "3rd Generation Partnership Project; Technical Specification Group Radio Access Network; NR; NR and NG-RAN Overall Description; Stage 2 (Release16)".
3GPP TSG RAN Meeting #89e, Electronic Meeting, Sep. 14-18, 2020, RP-201677, Ericsson, "Revised SID on Study on support of reduced capability NR devices".
3GPP TSG-RAN WG1 Meeting #103-e, e-Meeting, Oct. 26-Nov. 13, 2020, R1-20008072, Nokia, Nokia Shanghai Bell, "Initial access for REDCAP UEs".
3GPP TSG RAN WG1 Meeting #103e, E-meeting, Oct. 26-Nov. 13, 2020, R1-2008296, Lenovo, Motorola Mobility, "Framework and Principles for RedCap".
3GPP TSG-RAN WG1 Meeting #103, e-Meeting, Oct. 26-Nov. 13, 2020, R1-2008620, Qualcomm Incorporated, "UE Complexity Reduction for NR RedCap Devices".

* cited by examiner

BASE STATION AND USER EQUIPMENT

CROSS-REFERENCE TO RELATED APPLICATIONS

This application is a continuation application of International Patent Application No. PCT/JP2021/036016, filed on Sep. 29, 2021, which designated the U.S. and claims the benefit of priority from Japanese Patent Application No. 2020-188299, filed on Nov. 11, 2020, the entire contents of which are incorporated herein by reference.

BACKGROUND

1. Technical Field

The present disclosure relates to a base station and a user equipment.

2. Related Art

Mobile communication technologies have been proposed and standardized as Technical Specifications (TSs) in 3rd Generation Partnership Project (3GPP). Currently in particular, 5th Generation (5G) technologies have been proposed and standardized.

SUMMARY

A base station according to an aspect of the present disclosure includes a memory storing a program, and one or more processors configured to execute the program to transmit frequency information indicating an Absolute Radio Frequency Channel Number of a Synchronization Signal and Physical Broadcast Channel, SS/PBCH, block, SSB, used for a Reduced Capability user equipment, and measurement information used for the Reduced Capability user equipment to perform measurement based on the SSB. The measurement information includes information indicating measurement timing for the measurement based on the SSB.

A user equipment according to an aspect of the present disclosure includes a memory storing a program, and one or more processors configured to execute the program to receive frequency information indicating an Absolute Radio Frequency Channel Number of a Synchronization Signal and Physical Broadcast Channel, SS/PBCH, block, SSB, used for a Reduced Capability user equipment, and measurement information used for the Reduced Capability user equipment to perform measurement based on the SSB, and perform, on the basis of information indicating a measurement timing included in the measurement information, the measurement based on the SSB.

DETAILED DESCRIPTION OF THE PREFERRED EMBODIMENTS

Figure 1:
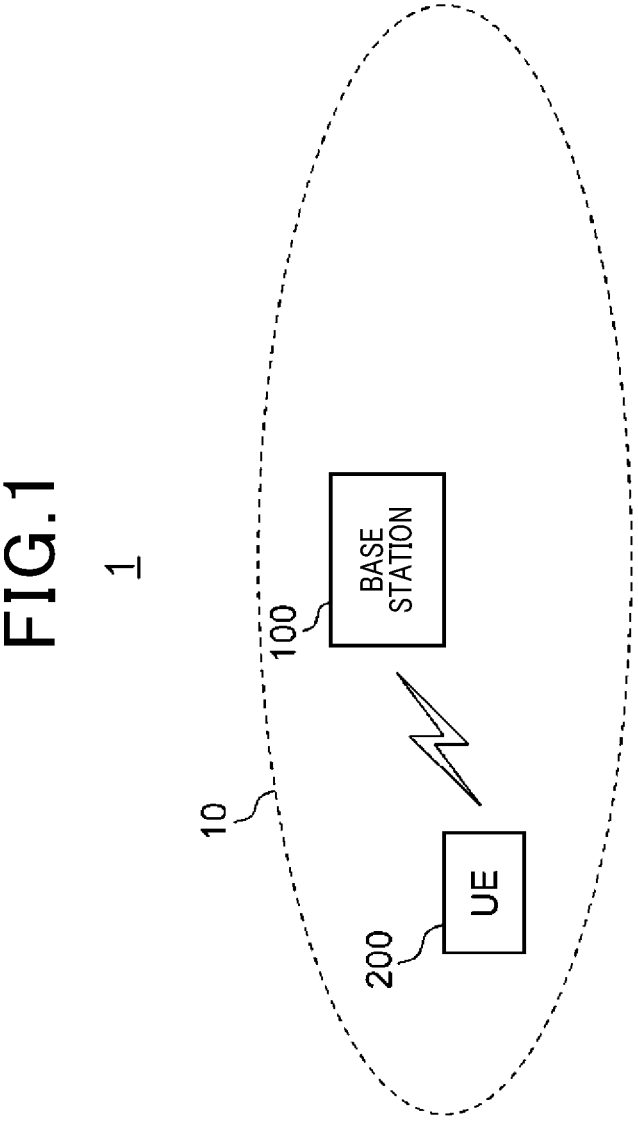
FIG. 1 is an explanatory diagram illustrating an example of a schematic configuration of a system according to an embodiment of the present disclosure.

For example, as described in 3GPP TS 38.331 V16.2.0 (2020-09), a base station broadcasts System Information, and User Equipments (UEs) receive the System Information. The System Information includes a Master Information Block (MIB), a System Information Block 1 (SIB1), and other SIBs.

Moreover, as described in 3GPP TS 38.300 V16.3.0 (2020-09), a plurality of Synchronization Signal and Physical Broadcast Channel (SS/PBCH) blocks (SSBs) each of which includes a MIB can be transmitted at different frequencies in a carrier.

Further, as described in RP-201677, UEs with reduced capabilities are being studied. For example, study on UE complexity reduction such as reduction in the number of antennas and reduction in bandwidth has begun.

According to 3GPP TS 38.331 V16.2.0 (2020-09), the MIB includes controlResourceSetZero that determines a Control Resource Set (CORESET) #0 in which a Physical Downlink Control Channel (PDCCH) for a SIB1 is located. Further, according to 3GPP TS 38.331 V16.2.0 (2020-09), the SIB1 includes a parameter set (that is, genericParameters) for an initial Bandwidth Part (BWP). However, a detailed study by the inventors has revealed that, since controlResourceSetZero and genericParameters are common information for all UEs, the CORESET #0 and the initial BWP will be unsuitable in terms of bandwidth for a UE with a reduced capability as described in RP-201677.

In this regard, the inventors have come to an idea of transmitting a plurality of SSBs in a carrier as described in 3GPP TS 38.300 V16.3.0 (2020-09), and using an SSB included in the plurality of SSBs as an SSB for a UE with a reduced capability. However, a detailed study by the inventors has revealed an issue that, a UE with a reduced capability performs frequency search many times to receive a desired SSB (that is, the SSB for a UE with a reduced capability) out of the plurality of SSBs, and it would take a long time.

An object of the present disclosure is to provide a base station and a user equipment that enable the user equipment to receive a desired SSB more quickly.

A base station according to an aspect of the present disclosure includes an information obtaining unit configured to obtain a System Information Block 1, SIB1, and a communication processing unit configured to transmit the SIB1. The SIB1 includes frequency information indicating a frequency at which an SS/PBCH block, SSB, for a user equipment with a limited bandwidth capability is transmitted in a carrier.

A user equipment according to an aspect of the present disclosure includes a communication processing unit configured to receive a System Information Block 1, SIB1, that includes frequency information indicating a frequency at which an SS/PBCH block, SSB, for a user equipment with a limited bandwidth capability is transmitted in a carrier; and an information obtaining unit configured to obtain the frequency information included in the SIB1.

The present disclosure enables a user equipment to receive a desired SSB more quickly. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:
1. Configuration of System
2. Configuration of Base Station
3. Configuration of User Equipment
4. Operation Examples
5. Modification Examples

1. Configuration of System

A configuration example of a system 1 according to an embodiment of the present disclosure will be described with reference to FIG. 1. Referring to FIG. 1, the system 1 includes a base station 100 and a user equipment (UE) 200.

For example, the system 1 is a system compliant with Technical Specifications (TSs) of 3GPP. More specifically, for example, the system 1 is a system compliant with 5G or New Radio (NR) TSs. Naturally, the system 1 is not limited to this example.

(1) Base Station 100

The base station 100 is a node in a Radio Access Network (RAN) and communicates with a UE (for example, UE 200) located within a coverage area 10 of the base station 100.

For example, the base station 100 communicates with a UE (for example, UE 200) using a RAN protocol stack. For example, the protocol stack includes a Radio Resource Control (RRC) layer, a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Alternatively, the protocol stack may include some, but not all, of these layers.

For example, the base station 100 is a gNB. The gNB is a node that provides NR user plane and control plane protocol terminations towards a UE and is connected to the 5G Core Network (5GC) via an NG interface. Alternatively, the base station 100 may be an en-gNB.

The base station 100 may include a plurality of nodes. The plurality of nodes may include a first node that hosts higher layers included in the protocol stack, and a second node that hosts lower layers included in the protocol stack. The higher layers may include the RRC layer, the SDAP layer, and the PDCP layer, while the lower layers may include the RLC layer, the MAC layer, and the PHY layer. The first node may be a Central Unit (CU), and the second node may be a Distributed Unit (DU). Note that the plurality of nodes may include a third node that performs lower processing of the PHY layer, and the second node may perform higher processing of the PHY layer. The third node may be a Radio Unit (RU).

Alternatively, the base station 100 may be one of the plurality of nodes, and may be connected to another unit of the plurality of nodes.

The base station 100 may be an Integrated Access and Backhaul (IAB) donor or an IAB node.

(2) UE 200

The UE 200 communicates with a base station. For example, the UE 200 communicates with the base station 100 when being located within the coverage area 10 of the base station 100.

For example, the UE 200 communicates with a base station (for example, base station 100) using the protocol stack.

2. Configuration of Base Station

Figure 2:
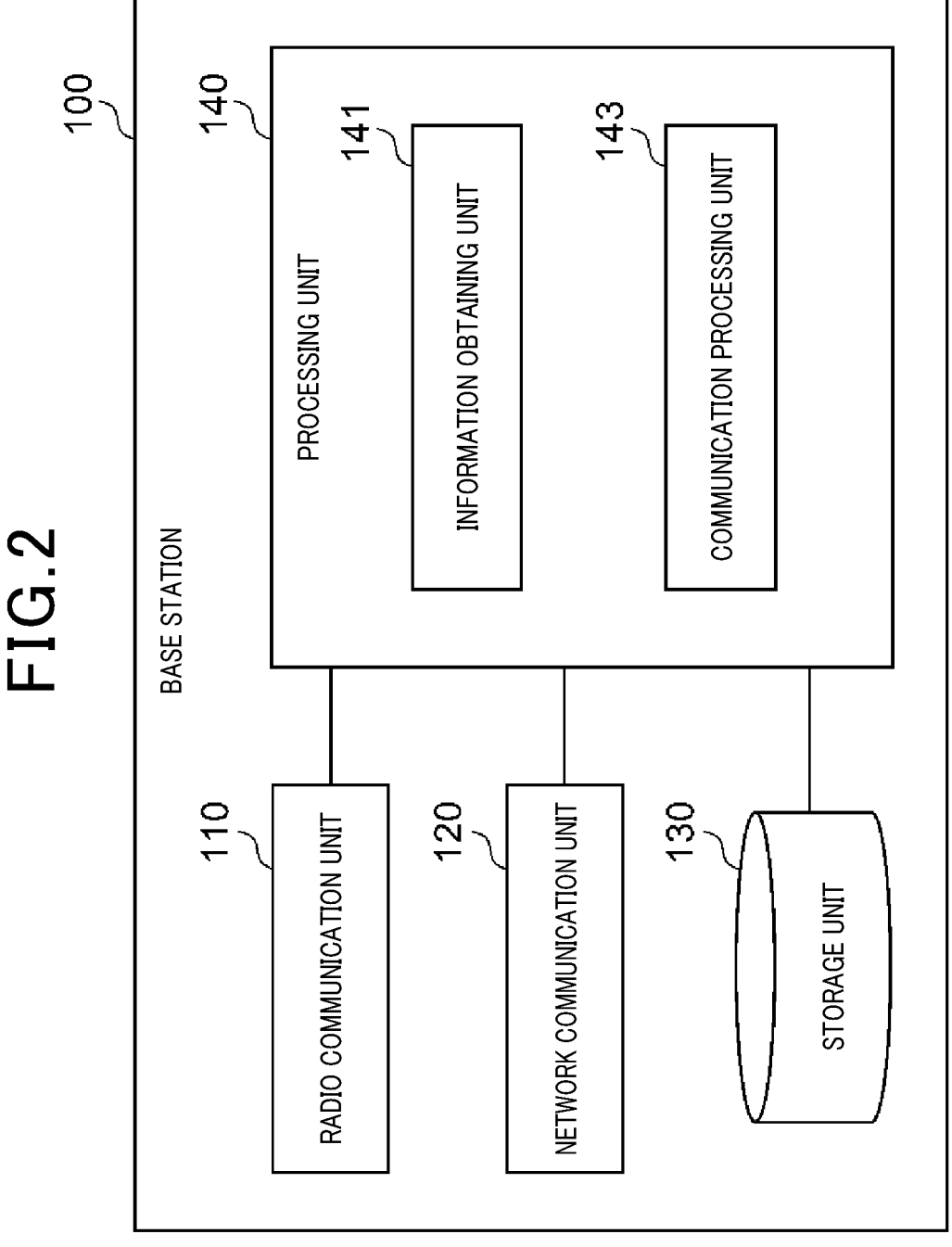
FIG. 2 is a block diagram illustrating an example of a schematic functional configuration of a base station according to an embodiment of the present disclosure.
Figure 3:
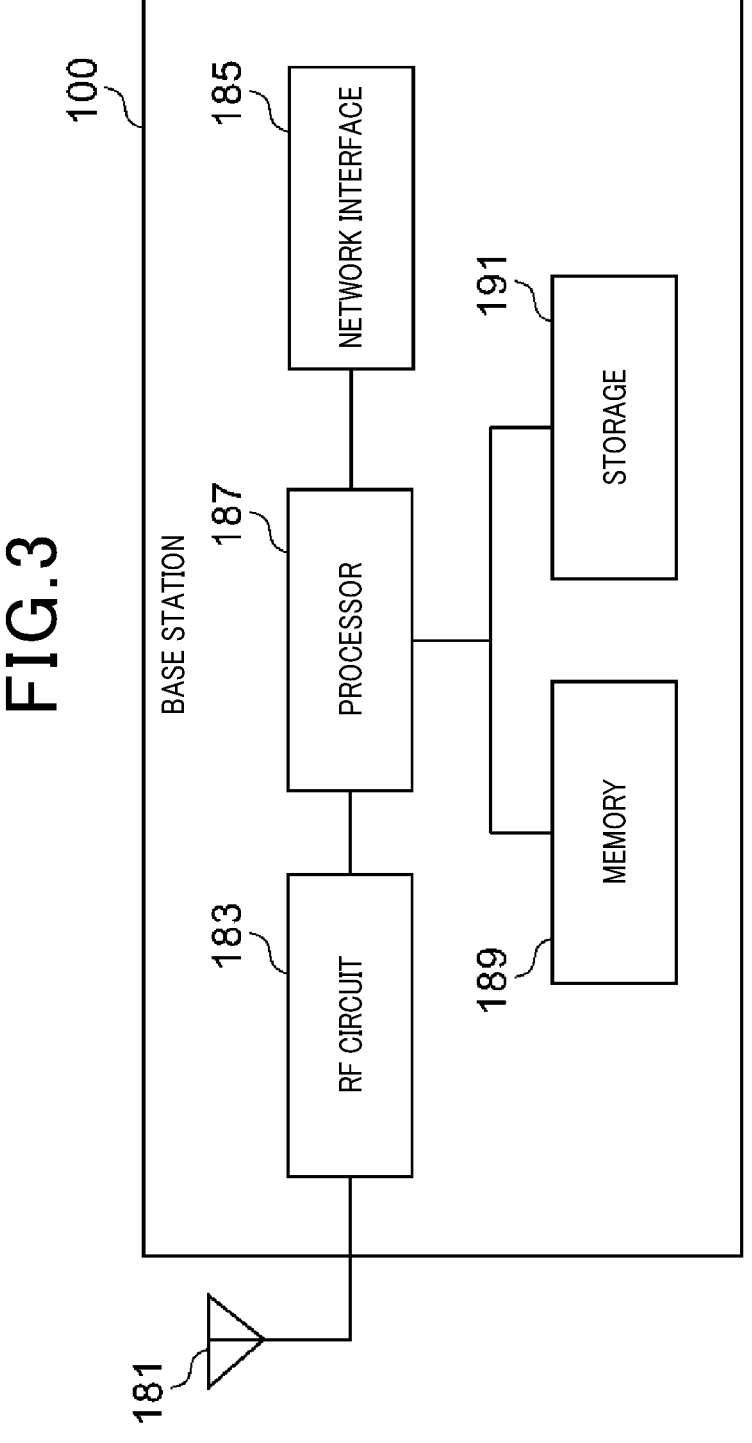
FIG. 3 is a block diagram illustrating an example of a schematic hardware configuration of the base station according to an embodiment of the present disclosure.

A configuration example of the base station 100 according to an embodiment of the present disclosure will be described with reference to FIGS. 2 and 3.

(1) Functional Configuration

First, a functional configuration example of the base station 100 according to an embodiment of the present disclosure will be described with reference to FIG. 2. Referring to FIG. 2, the base station 100 includes a radio communication unit 110, a network communication unit 120, a storage unit 130, and a processing unit 140.

The radio communication unit 110 wirelessly transmits and receives signals. For example, the radio communication unit 110 receives signals from and transmits signals to a UE.

The network communication unit 120 receives signals from and transmits signals to the network.

The storage unit 130 stores various information.

The processing unit 140 provides various functions of the base station 100. The processing unit 140 includes an information obtaining unit 141 and a communication processing unit 143. Note that the processing unit 140 may further include a component other than these components. That is, the processing unit 140 may also perform an operation other than operations of these components. Specific operations of the information obtaining unit 141 and the communication processing unit 143 will be described in detail later.

For example, the processing unit 140 (communication processing unit 143) communicates with a UE (for example, UE 200) via the radio communication unit 110. For example, the processing unit 140 communicates with other nodes (for example, nodes within the core network or other base stations) via the network communication unit 120.

(2) Hardware Configuration

Next, a hardware configuration example of the base station 100 according to an embodiment of the present disclosure will be described with reference to FIG. 3. Referring to FIG. 3, the base station 100 includes an antenna 181, an RF circuit 183, a network interface 185, a processor 187, a memory 189, and a storage 191.

The antenna 181 converts signals into radio waves, and emits the radio waves into the air. In addition, the antenna 181 receives radio waves in the air, and converts the radio waves into signals. The antenna 181 may include a transmitting antenna and a receiving antenna, or may be a single antenna for transmission and reception. The antenna 181 may be a directional antenna, and may include a plurality of antenna elements.

The RF circuit 183 performs analog processing on signals that are transmitted and received through the antenna 181. The RF circuit 183 may include a high-frequency filter, an amplifier, a modulator, a lowpass filter, and the like.

The network interface 185 is, for example, a network adaptor, and transmits signals to and receives signals from the network.

The processor 187 performs digital processing on signals that are transmitted and received through the antenna 181 and the RF circuit 183. The digital processing includes processing of the RAN protocol stack. The processor 187 also performs processing on signals that are transmitted and received through the network interface 185. The processor 187 may include a plurality of processors, or may be a single processor. The plurality of processors may include a baseband processor that performs the digital processing and one or more processors that perform other processing.

The memory 189 stores a program executed by the processor 187, parameters related to the program, and data related to the program. The memory 189 may include at least one of a Read Only Memory (ROM), an Erasable Programmable Read Only Memory (EPROM), an Electrically Erasable Programmable Read Only Memory (EEPROM), a Random Access Memory (RAM), and a flash memory. All or part of the memory 189 may be included in the processor 187.

The storage 191 stores various information. The storage 191 may include at least one of a Solid State Drive (SSD) and a Hard Disc Drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

A part or all of the processing unit 140 may be virtualized. In other words, a part or all of the processing unit 140 may be implemented as a virtual machine. In this case, a part or all of the processing unit 140 may operate as a virtual machine on a physical machine including a processor, a memory, and the like (that is, hardware) and a hypervisor.

Given the hardware configuration described above, the base station 100 may include a memory (that is, memory 189) that stores a program and one or more processors (that is, processor 187) capable of executing the program, and the one or more processors may be configured to execute the program to perform operations of the processing unit 140. The program may be a program for causing the processors to execute the operations of the processing unit 140.

3. Configuration of User Equipment

Figure 4:
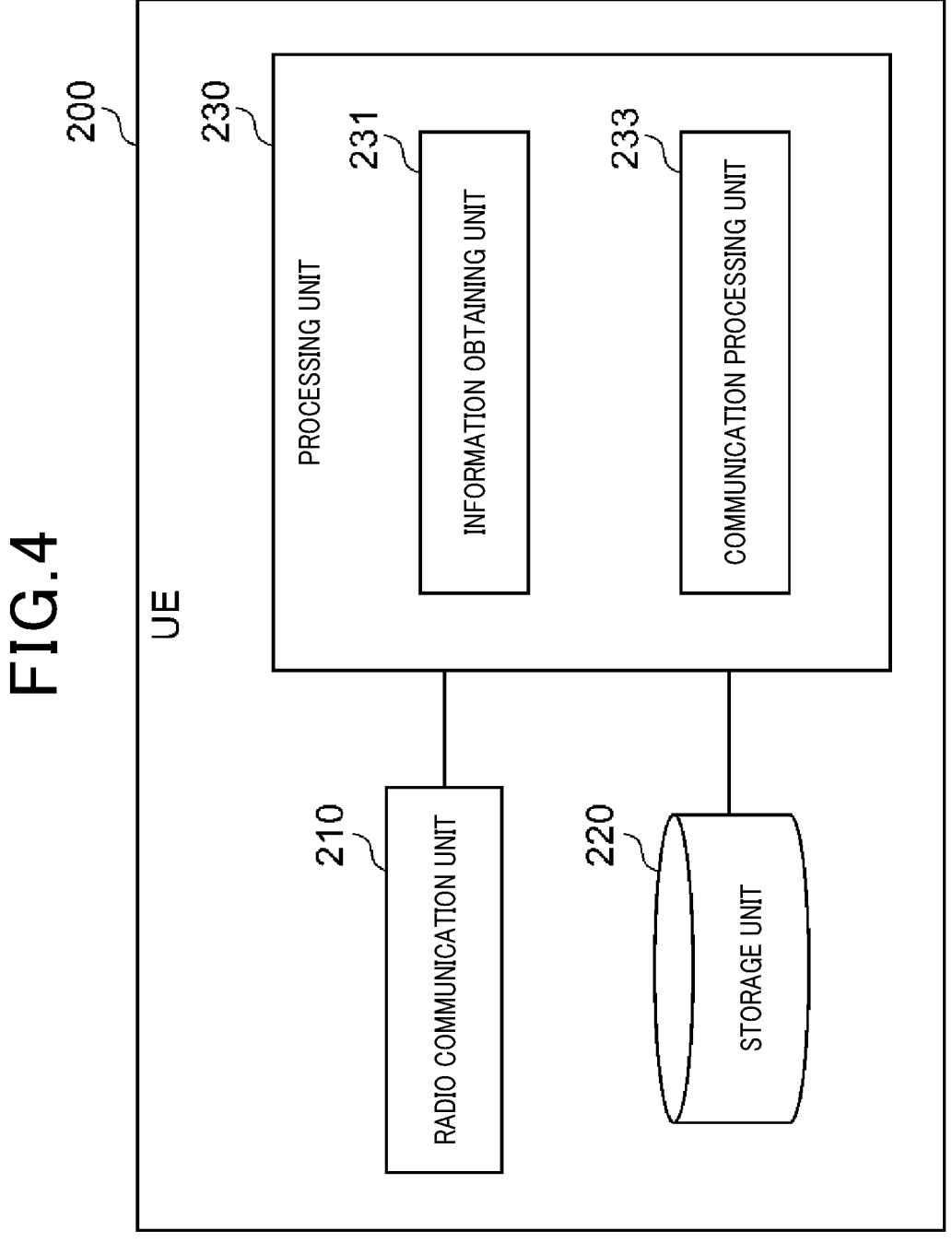
FIG. 4 is a block diagram illustrating an example of a schematic functional configuration of a user equipment according to an embodiment of the present disclosure.
Figure 5:
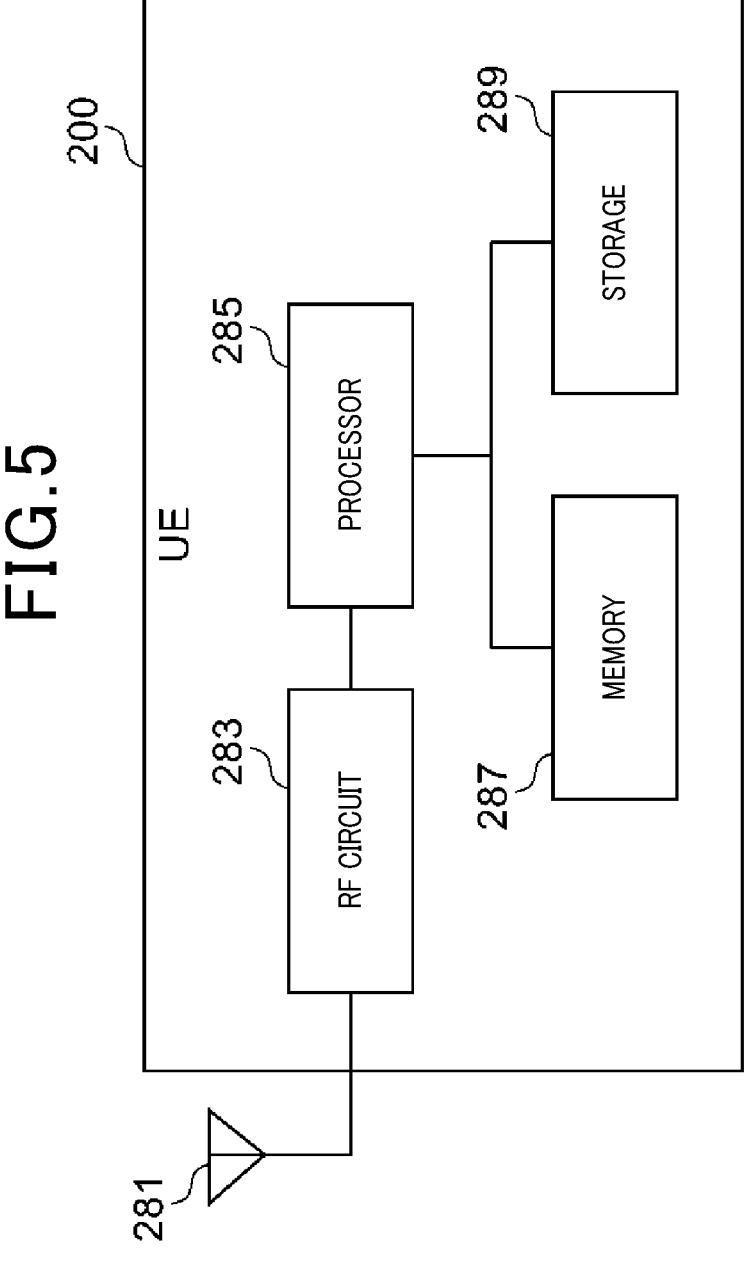
FIG. 5 is a block diagram illustrating an example of a schematic hardware configuration of the user equipment according to an embodiment of the present disclosure.

A configuration example of the UE 200 according to an embodiment of the present disclosure will be described with reference to FIGS. 4 and 5.
(1) Functional Configuration
First, a functional configuration example of the UE 200 according to an embodiment of the present disclosure will be described with reference to FIG. 4. Referring to FIG. 4, the UE 200 includes a radio communication unit 210, a storage unit 220, and a processing unit 230.

The radio communication unit 210 wirelessly transmits and receives signals. For example, the radio communication unit 210 receives signals from and transmits signals to a base station. For example, the radio communication unit 210 receives signals from and transmits signals to another UE.

The storage unit 220 stores various information.

The processing unit 230 provides various functions of the UE 200. The processing unit 230 includes an information obtaining unit 231 and a communication processing unit 233. Note that the processing unit 230 may further include a component other than these components. That is, the processing unit 230 may also perform an operation other than operations of these components. Specific operations of the information obtaining unit 231 and the communication processing unit 233 will be described in detail later.

For example, the processing unit 230 (communication processing unit 233) communicates via the radio communication unit 210 with a base station (for example, base station 100) or another UE.
(2) Hardware Configuration
Next, a hardware configuration example of the UE 200 according to an embodiment of the present disclosure will be described with reference to FIG. 5. Referring to FIG. 5, the UE 200 includes an antenna 281, an RF circuit 283, a processor 285, a memory 287, and a storage 289.

The antenna 281 converts signals into radio waves, and emits the radio waves into the air. In addition, the antenna 281 receives radio waves in the air, and converts the radio waves into signals. The antenna 281 may include a transmitting antenna and a receiving antenna, or may be a single antenna for transmission and reception. The antenna 281 may be a directional antenna, and may include a plurality of antenna elements.

The RF circuit 283 performs analog processing on signals that are transmitted and received through the antenna 281. The RF circuit 283 may include a high-frequency filter, an amplifier, a modulator, a lowpass filter, and the like.

The processor 285 performs digital processing on signals that are transmitted and received through the antenna 281 and the RF circuit 283. The digital processing includes processing of the RAN protocol stack. The processor 285 may include a plurality of processors, or may be a single processor. The plurality of processors may include a baseband processor that performs the digital processing and one or more processors that perform other processing.

The memory 287 stores a program executed by the processor 285, parameters related to the program, and data related to the program. The memory 287 may include at least one of a ROM, an EPROM, an EEPROM, a RAM, and a flash memory. All or part of the memory 287 may be included in the processor 285.

The storage 289 stores various information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a System on Chip (SoC) including the processor 285 and the memory 287. The SoC may include the RF circuit 283, and the radio communication unit 210 may also be implemented by this SoC.

Given the hardware configuration described above, the UE 200 may include a memory (that is, memory 287) that stores a program and one or more processors (that is, processor 285) capable of executing the program, and the one or more processors may be configured to execute the program to perform operations of the processing unit 230. The program may be a program for causing the processors to execute the operations of the processing unit 230.

4. Operation Examples

Operation examples of the base station 100 and the UE 200 according to an embodiment of the present disclosure will be described with reference to FIGS. 6 to 8.
(1) UE with Limited Bandwidth Capability
Before describing the operation examples, a UE with a limited bandwidth capability will be described as a premise.

A UE with a limited bandwidth capability has a narrower maximum bandwidth than a normal UE. The limited bandwidth capability may be referred to as a reduced bandwidth capability or a narrow bandwidth capability.

Note that the UE with a limited bandwidth capability may have one or more other limited capabilities and may be simply referred to as a UE with a limited capability (or a reduced capability) or a Reduced Capability (RedCap) UE. For example, the one or more other limited capabilities may include a limited capability for the number of antennas, and the UE with a limited capability may have fewer antennas than a normal UE. The one or more other limited capabilities may include a limited duplex capability, and the UE with a limited capability may be capable of communicating only in half-duplex. The half-duplex may be Frequency Division Duplex (FDD) half-duplex (half-duplex-FDD).

The UE with a limited bandwidth capability may have a relaxed capability. For example, the relaxed capability may include a relaxed processing capability, and the UE with a limited bandwidth capability may have lower processing performance than a normal UE.

In the following description, a "UE with a limited bandwidth capability" is represented as a "RedCap UE" for simplifying the representation. That is, in the following description, a "RedCap UE" means a "UE with a limited bandwidth capability".

(2) Operation of Base Station 100: Transmission of SSB

For example, the base station 100 (communication processing unit 143) transmits a plurality of SSBs at different frequencies in a carrier, respectively.

Herein, "transmit an SSB at a frequency" means, for example, to transmit the SSB with the frequency as a center frequency of the SSB.

The PBCH of each SSB includes a MIB. The MIB in an SSB includes CORESET information regarding a CORESET. The CORESET is a CORESET for a Type 0 Physical Downlink Control Channel (PDCCH) Common Search Space (CSS) set. In other words, the CORESET is a CORESET #0 In the CORESET, a PDCCH for a SIB1 is located. The CORESET information is controlResourceSetZero.

In particular, the plurality of SSBs include an SSB for a RedCap UE. A MIB in the SSB includes CORESET information (that is, controlResourceSetZero) regarding a CORESET for a RedCap UE. For example, the bandwidth of the CORESET is narrower than the bandwidth of a CORESET for a normal UE.

Figure 6:
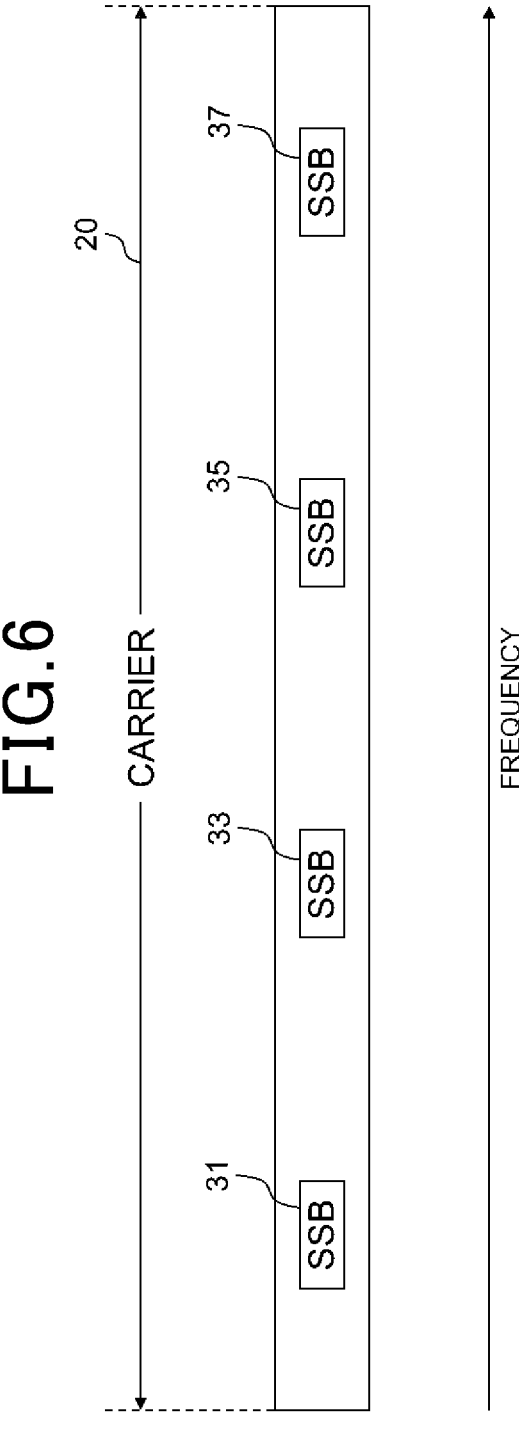
FIG. 6 is an explanatory diagram for explaining an example of transmission of a plurality of SSBs according to an embodiment of the present disclosure.

Referring to FIG. 6, for example, four SSBs (that is, SSB 31, SSB 33, SSB 35, and SSB 37) are transmitted at different frequencies in a carrier 20. For example, the SSB 31 is an SSB for a normal UE, and a MIB in the SSB 31 includes CORESET information regarding a CORESET for a normal UE. Meanwhile, the SSB 35 is an SSB for a RedCap UE, and a MIB in the SSB 35 includes CORESET information regarding a CORESET for a RedCap UE. For example, the bandwidth of the CORESET for a RedCap UE is narrower than the bandwidth of the CORESET for a normal UE.

Naturally, two or more SSBs for a RedCap UE may be transmitted in the carrier. Referring again to FIG. 6, for example, the SSB 33 or the SSB 37 may be an SSB for a RedCap UE.

Transmitting SSBs as described above enables, for example, use of a CORESET #0 for a normal UE and a CORESET #0 for a RedCap UE.

(3) Operation of Base Station 100: Transmission of SIB1

For example, the base station 100 (information obtaining unit 141) obtains a plurality of SIB1s respectively corresponding to the plurality of SSBs. The base station 100

(communication processing unit 143) transmits the plurality of SIB1s. The base station 100 (communication processing unit 143) transmits the plurality of SIB1s also in the carrier.

Referring again to FIG. 6, for example, the base station 100 (communication processing unit 143) transmits SIB1s respectively corresponding to the SSB 31, the SSB 33, the SSB 35, and the SSB 37.

—Transmission of SIB1 for Normal UE

The base station 100 (information obtaining unit 141) obtains a SIB1. The base station 100 (communication processing unit 143) transmits the SIB1. For example, the SIB1 is a SIB1 corresponding to an SSB for a normal UE (that is, SIB1 for a normal UE). The plurality of SIB1s include this SIB1.

Referring again to FIG. 6, for example, the SIB1 is a SIB1 corresponding to the SSB 31. That is, a PDCCH for the SIB1 is transmitted in a CORESET determined by the CORESET information included in the MIB in the SSB 31.

——Frequency Information

In an embodiment of the present disclosure in particular, the SIB1 includes frequency information indicating a frequency at which an SSB for a RedCap UE is transmitted in the carrier.

For example, the frequency is an SSB frequency, which is specifically the 0th resource element (that is, 0th subcarrier) in the 10th resource block of 20 resource blocks, RBs, that constitute the SSB. The frequency is indicated in the frequency information by an Absolute Radio Frequency Channel Number (ARFCN) of the frequency.

Referring again to FIG. 6, for example, the SIB1 corresponding to the SSB 31 includes frequency information indicating a frequency at which the SSB 35 is transmitted in the carrier 20.

This, for example, enables the UE 200 to receive a desired SSB more quickly. More specifically, for example, in a case where the UE 200 is a RedCap UE, the UE 200 can receive an SSB for a RedCap UE more quickly. That is, even in a case where the UE 200 has unintentionally received an SSB for a normal UE and a SIB1 for a normal UE, the UE 200 can know a frequency of an SSB for a RedCap UE from the frequency information included in the SIB1. Therefore, the UE 200 is not required to keep repeatedly searching for the frequency and can receive an SSB for a RedCap UE quickly.

As described above, two or more SSBs for a RedCap UE may be transmitted in the carrier. In this case, the SIB1 may include the frequency information for each of the two or more SSBs. This, for example, enables the UE 200 to select one SSB from among two or more SSBs.

——Measurement Information

For example, the SIB1 includes measurement information for measurement based on the SSB for a RedCap UE.

Referring again to FIG. 6, for example, the SIB1 corresponding to the SSB 31 includes measurement information for measurement based on the SSB 35.

For example, the measurement information includes information regarding a timing of measurement. More specifically, for example, the information regarding a timing of measurement is information of a measurement timing configuration (MTC) for inter-frequency measurement. In other words, the information regarding a timing of measurement is information of timing occasions at which a UE measures an SSB. The information regarding a timing of measurement is, for example, SSB-MTC specified in 3GPP TS 38.331 V16.2.0. In a case where the SIB1 does not include information regarding a timing of measurement, a UE assumes that the periodicity of an SSB is a predetermined periodicity (for example, 5 ms).

For example, the measurement information includes information regarding a block to be measured. More specifically, for example, the information regarding a block to be measured is information of a set of synchronization signal (SS) blocks to be measured within an SSB-MTC duration. In other words, the information regarding a block to be measured is information of a pattern of SSBs. The information regarding a block to be measured is, for example, SSB-ToMeasure specified in 3GPP TS 38.331 V16.2.0. In a case where the SIB1 does not include the information regarding a block to be measured, a UE measures on all SSBs.

For example, the measurement information includes information regarding measurement of a Reference Signal Strength Indicator (RSSI). More specifically, for example, the information regarding measurement of an RSSI is information of a configuration used for measurement of an RSSI. The information regarding measurement of an RSSI is, for example, SS-RSSI-Measurement specified in 3GPP TS 38.331 V16.2.0. In a case where the SIB1 does not include the information regarding measurement of an RSSI, the same value as indicated by SS-RSSI-Measurement in a SIB2 is applied.

For example, the measurement information includes information regarding derivation of an index of an SSB transmitted by a neighboring cell. In a case where the information is set to true, a UE assumes System Frame Number (SFN) and frame boundary alignment across cells on the neighboring frequency. More specifically, for example, the information is information analogous to deriveSSB-IndexFromCell specified as an information element in a SIB2 in 3GPP TS 38.331 V16.2.0. In a case where the SIB1 does not include the information, a UE applies the same value as indicated by deriveSSB-IndexFromCell in a SIB2.

The measurement information, for example, enables the UE 200 to perform measurement based on an SSB for a RedCap UE.

As described above, two or more SSBs for a RedCap UE may be transmitted in the carrier. In this case, the SIB1 may include the measurement information for each of the two or more SSBs. This, for example, enables the UE 200 to perform measurement based on each of two or more SSBs. Therefore, for example, the UE 200 can also select an SSB with a good measurement result from among the two or more SSBs.

——Allowance/Barring of Access

For example, the SIB1 explicitly or implicitly indicates whether an access by a RedCap UE is allowed or barred.

For example, the SIB1 for a normal UE explicitly or implicitly indicates that the access is barred.

Referring again to FIG. 6, for example, the SIB1 (that is, a SIB1 for a normal UE) corresponding to the SSB 31 (that is, an SSB for a normal UE) explicitly or implicitly indicates that an access by a RedCap UE is barred.

As an example, the SIB1 does not include an information element indicating that an access by a RedCap UE is allowed, and as a result implicitly indicates that an access by a RedCap UE is barred.

As another example, the SIB1 may include an information element indicating that an access by a RedCap UE is barred, and as a result explicitly indicates that an access by a RedCap UE is barred.

As yet another example, the SIB1 may include an information element indicating whether an access by a RedCap UE is allowed or barred. In particular, the information element may indicate that an access by a RedCap UE is barred, and as a result the SIB1 may explicitly indicate that an access by a RedCap UE is barred.

This, for example, enables the UE 200 to be triggered to receive an SSB for a RedCap UE based on the frequency information.

—Transmission of SIB1 for RedCap UE

The base station 100 (information obtaining unit 141) obtains a SIB1 corresponding to an SSB for a RedCap UE (that is, a SIB1 for a RedCap UE). The base station 100 (communication processing unit 143) transmits the SIB1. The plurality of SIB1s include this SIB1.

For example, the SIB1 includes information regarding an initial downlink BWP for a RedCap UE and information regarding an initial uplink BWP for a RedCap UE.

Figure 7:
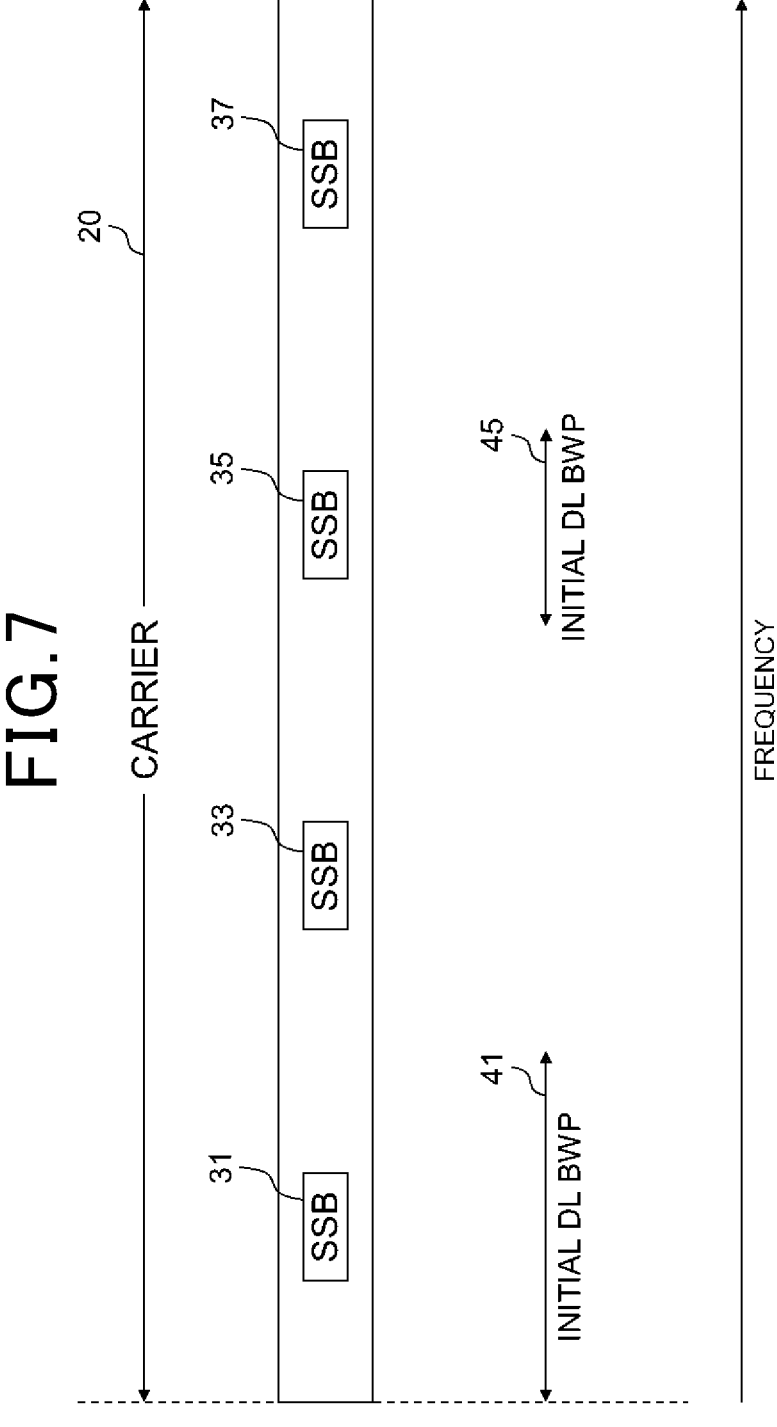
FIG. 7 is an explanatory diagram for explaining an example of an initial downlink BWP according to an embodiment of the present disclosure.
Figure 8:
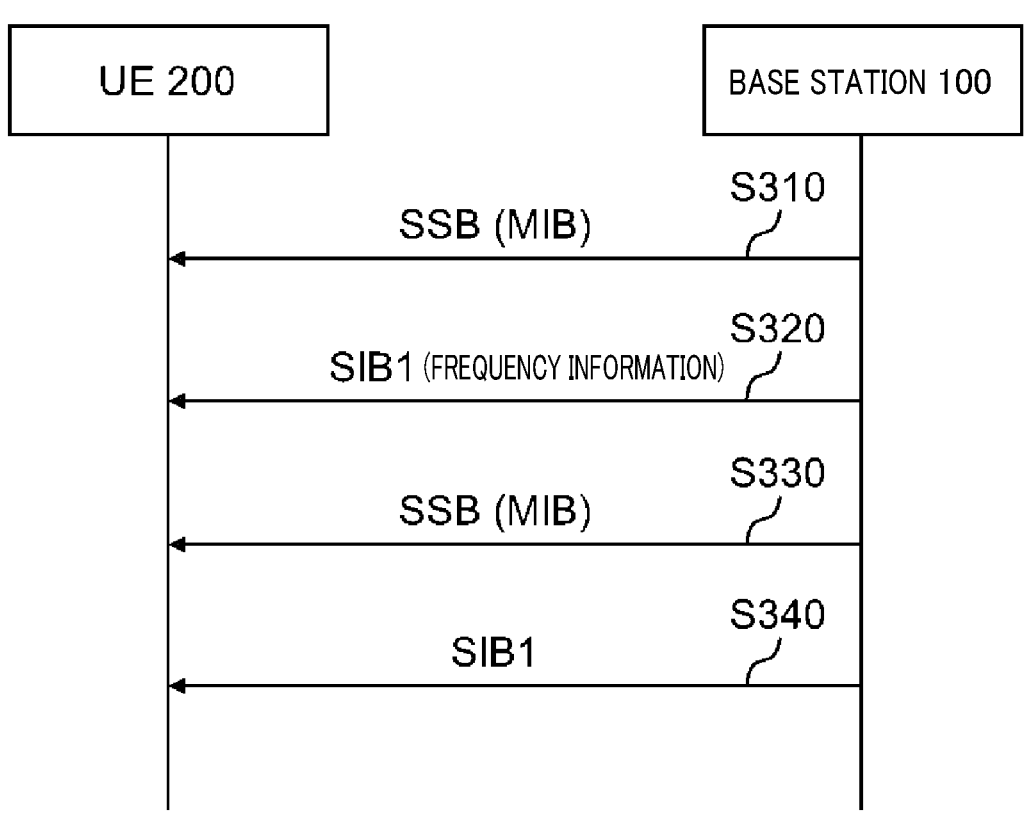
FIG. 8 is a sequence diagram for explaining an example of a schematic flow of processing according to an embodiment of the present disclosure.

Referring to FIG. 7, a SIB1 corresponding to the SSB 35 (that is, an SSB for a RedCap UE) includes information regarding an initial downlink BWP 45 for a RedCap UE. Meanwhile, the SIB1 corresponding to the SSB 31 (that is, an SSB for a normal UE) includes information regarding an initial downlink BWP 41 for a normal UE. The bandwidth of the initial downlink BWP 45 for a RedCap UE is narrower than the bandwidth of the initial downlink BWP 41 for a normal UE. Although an example of initial downlink BWPs is described herein, the same applies to initial uplink BWPs.

Transmitting SIB1s as described above enables, for example, use of an initial BWP for a normal UE and an initial BWP for a RedCap UE.

Note that, a SIB1 for a RedCap UE may explicitly or implicitly indicate that an access by a normal UE is barred. For example, the SIB1 may include barring information explicitly indicating that an access by a normal UE is barred. This, for example, enables a dedicated initial BWP for a RedCap UE to be realized.

(4) Operation of UE 200

—Reception of SSB

The UE 200 (communication processing unit 233) receives an SSB transmitted in the carrier by the base station 100.

For example, the UE 200 (communication processing unit 233) receives one of a plurality of SSBs transmitted at different frequencies in the carrier, respectively. For example, each of the plurality of SSBs is an SSB for a normal UE or an SSB for a RedCap UE.

For example, the UE 200 (communication processing unit 233) first receives an SSB for a normal UE. Referring again to FIG. 6, for example, the UE 200 (communication processing unit 233) first receives the SSB 31 for a normal UE.

—Reception of SIB1

The UE 200 (communication processing unit 233) receives a SIB1 corresponding to the received SSB. For example, the UE 200 (communication processing unit 233) receives a PDCCH for a SIB1 in a CORESET determined by CORESET information included in a MIB in the received SSB, and receives the SIB1.

For example, the UE 200 (communication processing unit 233) receives a SIB1 corresponding to the SSB for a normal UE (that is, a SIB1 for a normal UE), and the SIB1 includes the frequency information. The UE 200 (information obtaining unit 231) obtains the frequency information included in the SIB1. Referring again to FIG. 6, for example, the UE 200 (communication processing unit 233) receives the SIB1 corresponding to the SSB 31 for a normal UE. The SIB1 includes the frequency information indicating a frequency at which the SSB 35 is transmitted in the carrier 20. This, for example, enables the UE 200 to receive an SSB for a RedCap UE more quickly.

For example, the SIB1 also includes the measurement information, and the UE 200 (information obtaining unit 231) also obtains the measurement information included in the SIB1. In a case where the SIB1 includes the frequency information and the measurement information for each of two or more SSBs for a RedCap UE, the UE 200 (communication processing unit 233) may perform, on the basis of the measurement information, measurement based on each of the two or more SSBs. The UE 200 (communication processing unit 233) may select one of the two or more SSBs depending on a result of the measurement. This, for example, enables the UE 200 to select an SSB with a good measurement result.

For example, the SIB1 explicitly or implicitly indicates that an access by a RedCap UE is barred. In other words, the SIB1 indicates that the SIB1 is a SIB1 for a normal UE and not a SIB1 for a RedCap UE.

—Further Reception

——Reception of SSB

As described above, the frequency information indicates a frequency at which an SSB for a RedCap UE is transmitted in the carrier. For example, the UE 200 is a RedCap UE. In this case, the UE 200 (communication processing unit 233) receives the SSB for a RedCap UE based on the frequency information. Therefore, for example, the UE 200 can receive the SSB more quickly.

Referring again to FIG. 6, for example, a SIB1 corresponding to the SSB 31 for a normal UE includes the frequency information, and the frequency information indicates a frequency at which the SSB 35 for a RedCap UE is transmitted in the carrier 20. The UE 200 (communication processing unit 233) receives, based on the frequency information, the SSB 35 transmitted at the frequency.

A MIB in the SSB for a RedCap UE includes CORESET information (that is, controlResourceSetZero) regarding a CORESET for a RedCap UE. This, for example, enables the UE 200 to use a CORESET #0 for a RedCap UE.

——Reception of SIB1

The UE 200 (communication processing unit 233) receives a SIB1 corresponding to the SSB for a RedCap UE. For example, the UE 200 (communication processing unit 233) receives a PDCCH for a SIB1 in a CORESET determined by CORESET information included in a MIB in the received SSB, and receives the SIB1. The SIB1 is a SIB1 for a RedCap UE.

Referring again to FIG. 6, for example, the UE 200 (communication processing unit 233) receives the SIB1 corresponding to the SSB 35 for a RedCap UE.

The received SIB1 includes information regarding an initial downlink BWP for a RedCap UE and information regarding an initial uplink BWP for a RedCap UE. This, for example, enables the UE 200 to use an initial BWP for a RedCap UE.

(5) Process Flow

An example of part of processing according to an embodiment of the present disclosure will be described with reference to FIG. 8.

The base station 100 transmits an SSB for a normal UE in a carrier (S310). The SSB includes a MIB for a normal UE. The UE 200 receives the SSB for a normal UE and obtains the MIB for a normal UE.

The base station 100 obtains a SIB1 corresponding to the SSB for a normal UE (that is, a SIB1 for a normal UE) and transmits the SIB1 (S320). The SIB1 includes frequency information indicating a frequency at which an SSB for a RedCap UE is transmitted in the carrier. The UE 200 receives the SIB1 and obtains the frequency information included in the SIB1.

The base station 100 transmits an SSB for a RedCap UE at the frequency in the carrier (S330). The SSB includes a MIB for a RedCap UE. The UE 200 receives the SSB for a RedCap UE based on the frequency information and obtains the MIB for a RedCap UE. The UE 200 obtains CORESET information included in the MIB. The CORESET information is information regarding a CORESET for a RedCap UE.

The base station 100 obtains a SIB1 corresponding to the SSB for a RedCap UE (that is, a SIB1 for a RedCap UE) and transmits the SIB1 (S340). The UE 200 receives the SIB1. The SIB1 includes information regarding an initial downlink BWP for a RedCap UE and information regarding an initial uplink BWP for a RedCap UE.

5. Modification Examples

First to fifth modification examples of an embodiment of the present disclosure will be described. Two or more of these modification examples may be combined.

(1) First Modification Example

As described above as an example of an embodiment of the present disclosure, two or more SSBs for a RedCap UE may be transmitted in the carrier at different frequencies in the carrier. In this case, as described above, the SIB1 may include the frequency information for each of the two or more SSBs.

As a first modification example of an embodiment of the present disclosure, the UE 200 (communication processing unit 233) may receive an SSB that is determined depending on identification information for the UE 200 out of the two or more SSBs for a RedCap UE. The identification information may be any UE ID. For example, the identification information may be a UE ID defined in 3GPP TS 38.304 V16.2.0 (2020-09) or may be a 5G-S-Temporary Mobile Subscriber Identity (TMSI).

Specifically, the UE 200 may select one SSB for a RedCap UE from among the two or more SSBs for a RedCap UE depending on a result of a modulo operation using the number of SSBs included in the two or more SSBs for a RedCap UE and the UE ID. In a case where the number of the SSBs is N, a result of the module operation may be 0 to N−1, and the UE 200 may select an SSB corresponding to the result from among the N SSBs. As an example, the smaller the operation result is, the lower a frequency at which a selected SSB is transmitted may be. That is, in a case where the operation result is equal to 0, an SSB that is transmitted at the lowest frequency may be selected from the N SSBs, and in a case where the operation result is equal to N−1, an SSB that is transmitted at the highest frequency may be selected from the N SSBs.

This, for example, makes it possible to distribute UEs over two or more SSBs for a RedCap UE. As a result, the UEs can be distributed over two or more CORESET #0 for a RedCap UE respectively corresponding to the two or more SSBs. Further, the UEs can be distributed over two or more initial BWPs for a RedCap UE respectively corresponding to the two or more CORESET #0. Therefore, it is possible to avoid concentration of UEs on a specific band.

(2) Second Modification Example

As described above as an example of an embodiment of the present disclosure, a SIB1 for a normal UE includes the frequency information.

As a second modification example of an embodiment of the present disclosure, a SIB1 for a RedCap UE may also include frequency information. The frequency information may indicate a frequency at which another SSB for a RedCap UE is transmitted in the carrier.

This, for example, enables a RedCap UE to receive another SSB for a RedCap UE more quickly.

The second modification example may be combined with the first modification example. This, for example, makes it possible to further distribute UEs over two or more SSBs for a RedCap UE.

(3) Third Modification Example

As described above as an example of an embodiment of the present disclosure, the plurality of SSBs transmitted at different frequencies in a carrier are transmitted by the base station 100.

As a third modification example of an embodiment of the present disclosure, the base station 100 may use two or more nodes to transmit the plurality of SSBs.

—Two or More DUs

As an example, the base station 100 may use two or more DUs to transmit the plurality of SSBs. Referring again to the example of FIG. 6, as an example, the SSB 31, the SSB 33, the SSB 35, and the SSB 37 may be transmitted by different DUs respectively. As another example, two of the SSB 31, the SSB 33, the SSB 35, and the SSB 37 may be transmitted by a first DU, and the other two may be transmitted by a second DU.

In this case, the base station 100 may be a gNB including the two or more DUs. Alternatively, the base station 100 may be a CU connected to the two or more DUs.

—Two or More RUs

As another example, the base station 100 may use two or more RUs to transmit the plurality of SSBs. Referring again to the example of FIG. 6, as an example, the SSB 31, the SSB 33, the SSB 35, and the SSB 37 may be transmitted by different RUs respectively. As another example, two of the SSB 31, the SSB 33, the SSB 35, and the SSB 37 may be transmitted by a first RU, and the other two may be transmitted by a second RU.

In this case, the base station 100 may be a gNB including the two or more RUs. Alternatively, the base station 100 may be a DU connected to the two or more RUs or may be a CU connected to the DU.

(4) Fourth Modification Example

In the above-described example of an embodiment of the present disclosure, the plurality of SSBs transmitted at different frequencies in a carrier are transmitted by the base station 100. However, an embodiment of the present disclosure is not limited to this example.

As a fourth modification example of an embodiment of the present disclosure, the plurality of SSBs transmitted at different frequencies in a carrier may be transmitted by the base station 100 and a further base station. Referring again to the example of FIG. 6, the base station 100 may transmit the SSB 31 and the further base station may transmit the SSB 35. In this case, each of the SSB 33 and the SSB 37 may be transmitted by the base station 100, the further base station, or another further base station.

Each of the base station 100 and the further base stations may be a gNB. Alternatively, each of the base station 100 and the further base stations may be a DU or an RU.

(5) Fifth Modification Example

In the above-described example of an embodiment of the present disclosure, the system 1 is a system compliant with 5G or NR TSs. However, the system 1 according to an embodiment of the present disclosure is not limited to this example.

The system 1 may be a system compliant with other 3GPP TSs. As an example, the system 1 may be a system compliant with TSs of Long Term Evolution (LTE), LTE Advanced (LTE-A), or 4G, and the base station 100 may be an evolved Node B (eNB). As another example, the system 1 may be a system compliant with TSs of 3G, and the base station 100 may be a Node B. As yet another example, the system 1 may be a system compliant with TSs of next-generation (for example, 6G).

Alternatively, the system 1 may be a system compliant with TSs of another standardization organization for mobile communications.

While an embodiment of the present disclosure has been described above, the present disclosure is not limited to the embodiment. It will be understood by those skilled in the art that the embodiment is merely an example and various changes can be made without departing from the scope and the spirit of the present disclosure.

For example, steps in a process described in the present specification are not necessarily executed chronologically in the order described in the flowchart or sequence diagram. For example, steps in a process may be executed in an order different from the order described as the flowchart or sequence diagram, or may be executed in parallel. In addition, one or more steps in a process may be removed, or one or more further steps may be added to the process.

For example, there may be provided a method including the operations of one or more components of an apparatus described in the present specification, and there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to as another name such as mobile station, mobile terminal, mobile device, mobile unit, subscriber station, subscriber terminal, subscriber device, subscriber unit, wireless station, wireless terminal, wireless device, wireless unit, remote station, remote terminal, remote device, or remote unit.

For example, in the present disclosure, "transmit" may mean to perform processing of at least one layer in a protocol stack used for transmission, or to physically transmit signals wirelessly or by wire. Alternatively, "transmit" may mean a combination of performing processing of the at least one layer and physically transmitting signals wirelessly or by wire. Similarly, "receive" may mean to perform processing of at least one layer in a protocol stack used for reception, or to physically receive signals wirelessly or by wire. Alternatively, "receive" may mean a combination of performing processing of the at least one layer and physically receiving signals wirelessly or by wire.

For example, in the present disclosure, "obtain/acquire" may mean to obtain/acquire information from stored information, to obtain/acquire information from information received from another node, or to obtain/acquire information by generating the information.

For example, in the present disclosure, "include" and "comprise" do not mean that only listed items are included but mean that only listed items may be included or a further item as well as the listed items may be included.

For example, in the present disclosure, "or" does not mean exclusive OR but means inclusive OR.

Note that the technical features included in the above embodiment may be represented as the following features. Naturally, the present disclosure is not limited to the following features.

(Feature 1)

A base station (100) comprising:

an information obtaining unit (141) configured to obtain a System Information Block 1, SIB1; and a communication processing unit (143) configured to transmit the SIB1, wherein the SIB1 includes frequency information indicating a frequency at which a Synchronization Signal and Physical Broadcast Channel, SS/PBCH, block, SSB, (35) for a user equipment with a limited bandwidth capability is transmitted in a carrier (20).

(Feature 2)

The base station according to Feature 1, wherein the SSB is one of a plurality of SSBs transmitted at different frequencies in the carrier, respectively.

(Feature 3)

The base station according to Feature 1 or 2, wherein the SIB1 includes the frequency information for each of two or more SSBs for a user equipment with a limited bandwidth capability.

(Feature 4)

The base station according to any one of Features 1 to 3, wherein the frequency information is an Absolute Radio Frequency Channel Number, ARFCN, of the frequency.

(Feature 5)

The base station according to any one of Features 1 to 4, wherein the SIB1 includes measurement information for measurement based on the SSB.

(Feature 6)

The base station according to Feature 5, wherein the measurement information includes at least one of information regarding a timing of measurement, information regarding a block to be measured, information regarding measurement of a Reference Signal Strength Indicator, RSSI, and information regarding derivation of an index of an SSB transmitted by a neighboring cell.

(Feature 7)

The base station according to Feature 5 or 6, wherein the SIB1 includes the measurement information for each of two or more SSBs for a user equipment with a limited bandwidth capability.

(Feature 8)

The base station according to any one of Features 1 to 7, wherein the SIB1 explicitly or implicitly indicates whether an access by a user equipment with a limited bandwidth capability is allowed or barred.

(Feature 9)

The base station according to Feature 8, wherein the SIB1 explicitly or implicitly indicates that the access is barred.

(Feature 10)

The base station according to any one of Features 1 to 9, wherein the SIB1 is a SIB1 that corresponds to a further SSB (31) transmitted at a further frequency in the carrier.

(Feature 11)

The base station according to any one of Features 1 to 10, wherein a Master Information Block, MIB, in the SSB includes information regarding a Control Resource Set, CORESET, for a user equipment with a limited bandwidth capability.

(Feature 12)

The base station according to any one of Features 1 to 11, wherein a further SIB1 corresponding to the SSB includes information regarding an initial downlink Bandwidth Part, BWP, (45) for a user equipment with a limited bandwidth capability, and information regarding an initial uplink BWP for a user equipment with a limited bandwidth capability.

(Feature 13)

The base station according to any one of Features 1 to 12, wherein the communication processing unit is configured to transmit a plurality of SSBs at different frequencies in the carrier, respectively, and the plurality of SSBs include the SSB for a user equipment with a limited bandwidth capability.

(Feature 14)

The base station according to Feature 13, wherein the information obtaining unit is configured to obtain a plurality of SIB1 s respectively corresponding to the plurality of SSBs, the communication processing unit is configured to transmit the plurality of SIB1s, and the plurality of SIB1s include the SIB1.

(Feature 15)

A user equipment (200) comprising:

a communication processing unit (233) configured to receive a System Information Block 1, SIB1, that includes frequency information indicating a frequency at which a Synchronization Signal and Physical Broadcast Channel, SS/PBCH, block, SSB, (35) for a user equipment with a limited bandwidth capability is transmitted in a carrier (20); and an information obtaining unit (231) configured to obtain the frequency information included in the SIB1.

(Feature 16)

The user equipment according to Feature 15, wherein the communication processing unit is configured to receive the SSB based on the frequency information.

(Feature 17)

The user equipment according to Feature 15 or 16, wherein the SIB1 explicitly or implicitly indicates that an access by a user equipment with a limited bandwidth capability is barred.

(Feature 18)

A method performed by a base station (100), comprising:

obtaining a System Information Block 1, SIB1; and transmitting the SIB1, wherein the SIB1 includes frequency information indicating a frequency at which a Synchronization Signal and Physical Broadcast Channel, SS/PBCH, block, SSB, (35) for a user equipment with a limited bandwidth capability is transmitted in a carrier (20).

(Feature 19)

A method performed by a user equipment (200), comprising:

receiving a System Information Block 1, SIB1, that includes frequency information indicating a frequency at which a Synchronization Signal and Physical Broadcast Channel, SS/PBCH, block, SSB, (35) for a user equipment with a limited bandwidth capability is transmitted in a carrier (20); and obtaining the frequency information included in the SIB1.

(Feature 20)

A program for causing a computer to execute:

obtaining a System Information Block 1, SIB1; and transmitting the SIB1, wherein the SIB1 includes frequency information indicating a frequency at which a Synchronization Signal and Physical Broadcast Channel, SS/PBCH, block, SSB, (35) for a user equipment with a limited bandwidth capability is transmitted in a carrier (20).

(Feature 21)

A program for causing a computer to execute:

receiving a System Information Block 1, SIB1, that includes frequency information indicating a frequency at which a Synchronization Signal and Physical Broadcast Channel, SS/PBCH, block, SSB, (35) for a user equipment with a limited bandwidth capability is transmitted in a carrier (20); and obtaining the frequency information included in the SIB1.

(Feature 22)

A non-transitory tangible computer-readable storage medium having stored therein a program for causing a computer to execute:

obtaining a System Information Block 1, SIB1; and transmitting the SIB1, wherein the SIB1 includes frequency information indicating a frequency at which a Synchronization Signal and Physical Broadcast Channel, SS/PBCH, block, SSB, (35) for a user equipment with a limited bandwidth capability is transmitted in a carrier (20).

(Feature 23)

A non-transitory tangible computer-readable storage medium having stored therein a program for causing a computer to execute:

receiving a System Information Block 1, SIB1, that includes frequency information indicating a frequency at which a Synchronization Signal and Physical Broadcast Channel, SS/PBCH, block, SSB, (35) for a user equipment with a limited bandwidth capability is transmitted in a carrier (20); and obtaining the frequency information included in the SIB1.

What is claimed is:

1. A user equipment comprising:

a memory storing a program; and one or more processors configured to execute the program to:

receive system information including frequency information indicating an Absolute Radio Frequency Channel Number for a frequency of a Synchronization Signal and Physical Broadcast Channel, SS/PBCH, block, SSB, used for a Reduced Capability user equipment, measurement information used for the Reduced Capability user equipment to perform a measurement based on the SSB, and information indicating that the Reduced Capability user equipment is allowed to access the frequency of the SSB, and perform, on the basis of information indicating a measurement timing for an inter-frequency measurement included in the measurement information, the measurement based on the SSB in a case where the information used for indicating that the Reduced Capability user equipment is allowed to access the frequency of the SSB is included in the system information.

2. The user equipment according to claim 1, wherein the measurement information includes information indicating a set of SSBs to be measured within a duration of the measurement timing, and the one or more processors are configured to execute the program to perform, on the basis of the information indicating the set of the SSBs, the measurement based on the SSB.

3. The user equipment according to claim 1, wherein the measurement information includes information indicating a measurement of a Reference Signal Strength Indicator, RSSI, and the one or more processors are configured to execute the program to perform, on the basis of the information indicating the measurement of the RSSI, the measurement of the RSSI based on the SSB.

4. The user equipment according to claim 1, wherein the Reduced Capability user equipment is a user equipment with reduced capability regarding a maximum bandwidth or a number of antennas.

5. A base station comprising:

a memory storing a program; and one or more processors configured to execute the program to:

transmit system information including frequency information indicating an Absolute Radio Frequency Channel Number for a frequency of a Synchronization Signal and Physical Broadcast Channel, SS/PBCH, block, SSB, used for a Reduced Capability user equipment, measurement information used for the Reduced Capability user equipment to perform measurement based on the SSB, and information used for indicating that the Reduced Capability user equipment is allowed to access the frequency of the SSB, wherein the measurement based on the SSB is performed, on the basis of information indicating a measurement timing for inter-frequency measurement included in the measurement information, in a case where the information indicating that the Reduced Capability user equipment is allowed to access the frequency of the SSB is included in the system information.

6. The base station according to claim 5, wherein the measurement information includes information indicating a set of SSBs to be measured within a duration of the measurement timing, and the measurement based on the SSB is performed on the basis of the information indicating the set of the SSBs.

7. The base station according to claim 5, wherein the measurement information includes information indicating a measurement of a Reference Signal Strength Indicator, RSSI, and the measurement of the RSSI based on the SSB is performed on the basis of the information indicating the measurement of the RSSI.

8. The base station according to claim 5, wherein the Reduced capability user equipment is a user equipment with reduced capability regarding a maximum bandwidth or a number of antennas.

9. A method performed by a user equipment comprising:

receiving system information including frequency information indicating an Absolute Radio Frequency Channel Number for a frequency of a Synchronization Signal and Physical Broadcast Channel, SS/PBCH, block, SSB, used for a Reduced Capability user equipment, measurement information for the Reduced Capability user equipment to perform a measurement based on the SSB, and information indicating that the Reduced Capability user equipment is allowed to access the frequency of the SSB, and performing, on the basis of information indicating a measurement timing for an inter-frequency measurement included in the measurement information, the measurement based on the SSB in a case where the information indicating that the Reduced Capability user equipment is allowed to access the frequency of the SSB is included in the system information.

10. The method according to claim 9, wherein the measurement information includes information indicating a set of SSBs to be measured within a duration of the measurement timing, and the measurement based on the SSB is performed on the basis of the information indicating the set of the SSBs.

11. The method according to claim 9, wherein the measurement information includes information indicating a measurement of a Reference Signal Strength Indicator, RSSI, and the measurement of the RSSI based on the SSB is performed on the basis of the information indicating the measurement of the RSSI.

12. The method according to claim 9, wherein the Reduced Capability user equipment is a user equipment with reduced capability regarding a maximum bandwidth or a number of antennas.

\* \* \* \* \*